N. JOHNSON.
Whiffletree.
No. 55,112. Patented May 29, 1866.
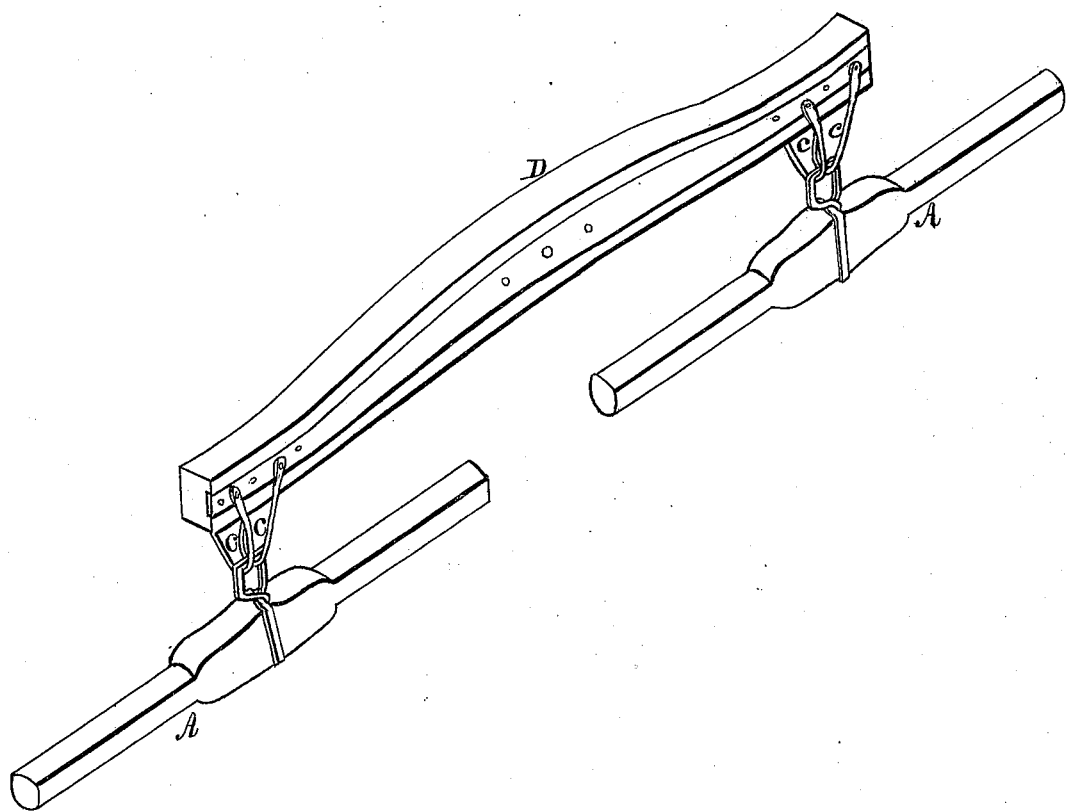
Witnesses:
Charles Alexander
John P. Jacobs
Inventor:
Niels Johnson
By
Alexander & Mason
Attys.

UNITED STATES PATENT OFFICE.

NIELS JOHNSON, OF RIPON, WISCONSIN.

IMPROVEMENT IN WHIFFLETREES.

Specification forming part of Letters Patent No. 55,112, dated May 29, 1866.

*To all whom it may concern:*

Be it known that I, NIELS JOHNSON, of Ripon, county of Fond du Lac, and State of Wisconsin, have invented certain new and useful Improvements in Attaching Whiffletrees; and I do hereby declare that the following is a full, clear, and exact description of the same, reference being had to the accompanying drawings, and to the letters of reference marked thereon.

In the annexed drawings, D represents the double-tree, and A A the whiffletrees. C C represent clevises, which are pivoted to the double-tree, two near each end. The two clevises near the ends are pivoted at from six to ten inches apart. A hook or loop secured to the whiffletrees passes through the clevises, as represented, to connect said whiffletrees to the double-tree.

The object of this arrangement is to equalize the draft on animals drawing a vehicle. When one horse allows his end of the double-tree to fall back he draws from the outer clevis, thus having the long end of the lever, while the other horse draws from the short end of the lever.

In turning the vehicle the horse on the side of the change of directions draws by the short lever and the other horse by the long lever, thus equalizing the draft.

Having thus fully described my invention, what I claim as new, and desire to secure by Letters Patent, is—

The clevises C C, arranged with the double-tree and whiffletrees, as and for the purpose herein set forth.

In witness that I claim the foregoing I have hereunto set my hand in the presence of witnesses.

NIELS JOHNSON.

Witnesses:
H. CROSWELL,
WILLIAM WOOD.